United States Patent [19]

Laurent

[11] Patent Number: 4,893,585
[45] Date of Patent: Jan. 16, 1990

[54] ZEOLITES IN POULTRY HATCHING

[75] Inventor: Sebastian M. Laurent, Greenwell Springs, La.

[73] Assignee: Ethyl Corporation, Richmond, Va.

[21] Appl. No.: 123,281

[22] Filed: Nov. 27, 1987

Related U.S. Application Data

[63] Continuation-in-part of Ser. No. 927,373, Nov. 6, 1986, abandoned.

[51] Int. Cl.$^4$ .............................................. A01K 45/00
[52] U.S. Cl. ............................................ 119/1; 426/2
[58] Field of Search ................................ 119/1; 426/2

[56] References Cited

U.S. PATENT DOCUMENTS

| | | |
|---|---|---|
| 2,882,243 | 4/1959 | Milton . |
| 3,120,834 | 2/1964 | Goldhaft et al. . |
| 3,836,676 | 9/1974 | Komakine ............. 426/74 |
| 4,469,047 | 9/1984 | Miller ..................... 119/1 |
| 4,515,780 | 5/1985 | Laurent et al. . |
| 4,556,564 | 12/1985 | Laurent et al. . |
| 4,610,882 | 9/1986 | Laurent et al. . |
| 4,610,883 | 9/1986 | Laurent et al. . |

FOREIGN PATENT DOCUMENTS

| | | |
|---|---|---|
| 939186 | 1/1974 | Canada . |
| 0224856 | 6/1987 | European Pat. Off. . |
| 59-203450 | 11/1984 | Japan . |
| 61-63284 | 4/1986 | Japan . |

OTHER PUBLICATIONS

Mumpton et al., *The Application of Natural Zeolites in Animal Science & Aquaculture, Journal of Animal Science,* 45, No. 5, 1188–1203 (1977).
Chung et al., *Nongsa Sihom Youngu Pogo,* 1978, 20 (Livestock), pp. 77–83.
Nolen et al., *Food & Cosmetic Toxicology,* 21, (5), p. 697 (1983).
Carlisle, *Nutrition Reviews,* 40 (7), pp. 193–198 (1982).
Carlisle, Chap. 4 of *Silicon & Siliceous Structures in Biological Systems,* Simpson, T. L., ed. B. E. Springer Verkog, New York (1981), pp. 69–94.
Edwards, *Poultry Science,* vol. 65, Suppl. No. 1 (1986).
Roland et al., *Poultry Science,* 64, 1177–1187 (1985).
Miles et al., *Nutrition Reports International,* 34, No. 6, 1097, (Dec., 1986).
Ingram et al., *Influence of Ethacal® Feed Component on Production Parameters of White Leghorn Hens During High Temperatures.*
Hatieganu et al., Buletinul Institutului Agronomic Cluj-Napoca, Zootehnie si Medicina 33, 27–34 (1979).
Nakaue, *Poultry Science,* 60, 944–949 (1981).
Vest et al., studies presented at *Zeo-Agriculture* '82.
Willis et al., Poultry Science, 61, 438–442 (1982).
Reagan, Luther M., Effects of Adding Zeolites to the Diets of Broiler Cockerels; Thesis, Colorado State Univ., Recommended for Acceptance, Apr. 25, 1984.

*Primary Examiner*—V. Millin
*Assistant Examiner*—N. Paul

[57] ABSTRACT

A method of improving the quality of poultry chicks wherein a small amount of zeolite is added directly to the poultry eggs producing the poultry chicks, prior to hatching of the poultry eggs.

14 Claims, No Drawings

ZEOLITES IN POULTRY HATCHING

CROSS-REFERENCE TO RELATED APPLICATION

This application is a continuation-in-part of application Ser. No. 927,373, filed Nov. 6, 1986 now abandoned.

BACKGROUND OF THE INVENTION

The present invention is in the general field of poultry farming and relates particularly to the treating of poultry eggs for improving hatching characteristics and the improved eggs produced thereby.

The demand for poultry and poultry eggs, especially chickens and chicken eggs has expanded considerably over the last decade. The poultry industry has grown from a home industry to a large scale manufacturing industry in which thousands of chickens and tens of thousands of eggs are produced daily at single poultry farms or egg laying installations. Some eggs are produced for eating and some eggs are produced for hatching. One problem with such large scale egg producing is egg breakage. Even a slight crack in an egg makes it unsuitable for hatching and most other marketing purposes. It is estimated that some six percent of all eggs produced are lost for marketing because of cracking or breakage. Shell strength is very important to inhibit breakage. The stronger the eggshell, the less likely the egg will be cracked or broken. Machinery and techniques necessary for carefully handling the eggs to avoid breakage are expensive and time consuming.

Eggs with weak shells also produce fewer chicks, poorer quality chicks, and ultimately poorer quality birds for either eating, laying or breeding. As eggshell strength is increased, the strength of the chick must also be increased or hatching will be severely inhibited.

An object of the present invention is to provide a treatment of the poultry egg itself whereby hatching parameters (including percentage of hatch) or health or strength characteristics are improved.

An important object of the present invention is to provide a means for treating poultry eggs for hatching whereby heavier or stronger, more vigorous chicks are produced. A related object is to provide improved avian eggs; i.e. eggs with improved hatching characteristics.

Another important object of the present invention is to provide a means for increasing the health, vigor or strength of the poultry chicks by treatment of the poultry egg itself prior to hatching. Other objects are mentioned below.

U.S. Pat. No. 4,556,564 discloses that the strength of poultry eggs can be substantially enhanced by adding a small amount of zeolite A to the diet of the laying poultry. Similarly, U.S. Pat. Nos. 4,610,882 and 4,610,883 disclose that food utilization and liveability are increased when a small amount of zeolite A is added to the diet of poultry.

Zeolites are crystalline, hydrated aluminosilicates of alkali and alkaline earth cations, having infinite, three-dimensional structures.

Zeolites consist basically of a three-dimensional framework of $SiO_4$ and $AlO_4$ tetrahedra. The tetrahedra are crosslinked by the sharing of oxygen atoms so that the ratio of oxygen atoms to the total of the aluminum and silicon atoms is equal to two or $O/(Al+Si)=2$. The electrovalence of each tetrahedra containing aluminum is balanced by the inclusion in the crystal of a cation, for example, a sodium ion. This balance may be expressed by the formula $Al/Na=1$. The spaces between the tetrahedra are occupied by water molecules prior to dehydration.

Zeolite A may be distinguished from other zeolites and silicates on the basis of their composition and X-ray powder diffraction patterns and certain physical characteristics. The X-ray patterns for these zeolites are described below. The composition and density are among the characteristics which have been found to be important in identifying these zeolites.

The basic formula for all crystalline sodium zeolites may be represented as follows:

$Na_2O \cdot Al_2O_3 \cdot xSiO_2 \cdot yH_2O$

In general, a particular crystalline zeolite will have values for "x" and "y" that fall in a definite range. The value "x" for a particular zeolite will vary somewhat since the aluminum atoms and the silicon atoms occupy essentially equivalent positions in the lattice. Minor variations in the relative number of these atoms do not significantly alter the crystal structure or physical properties of the zeolite. For zeolite A, the "x" value normally falls within the range $1.85 \pm 0.5$.

The value for "y" is not necessarily an invariant for all samples of zeolites. This is true because various exchangeable ions are of different size, and, since there is no major change in the crystal lattice dimensions upon ion exchange, the space available in the pores of the zeolite to accommodate water molecules varies. The average value for "y" for zeolite A is 5.1. The formula for zeolite A may be written as follows:

$1.0 \pm 0.2 Na_2O \cdot Al_2O_3 \cdot 1.85 \pm 0.5 SiO_2 \cdot yH_2O$

In the formula, "y" may be any value up to 6.

An ideal zeolite A has the following formula:

$(NaAlSiO_4)_{12} \cdot 27H_2O$

Among the ways of identifying zeolites and distinguishing them from other zeolites and other crystalline substances, the X-ray powder diffraction pattern has been found to be a useful tool. In obtaining the X-ray powder diffraction patterns, standard techniques are employed. The radiation is the $K\alpha$ doublet of copper and a Geiger counter spectrometer with a strip chart pen recorder is used. The peak heights, I, and the positions as a function of $2\theta$ where $\theta$ is the Bragg angle, are read from a spectrometer chart. From these, the relative intensities, $100I/I_o$, where $I_o$ is the intensity of the strongest line or peak and d the interplanar spacing in angstroms corresponding to the recorded lines are calculated.

X-ray powder diffraction data for a sodium zeolite A are given in Table I.

TABLE I

X-RAY DIFFRACTION PATTERN FOR ZEOLITE A

| $h^2 + k^2 + l^2$ | d (Å) | $\frac{100\ I}{I_o}$ |
|---|---|---|
| 1 | 12.29 | 100 |
| 2 | 8.71 | 70 |
| 3 | 7.11 | 35 |
| 4 | 6.15 | 2 |
| 5 | 5.51 | 25 |
| 6 | 5.03 | 2 |

TABLE I-continued

X-RAY DIFFRACTION PATTERN FOR ZEOLITE A

| $h^2 + k^2 + l^2$ | d (Å) | $\frac{100\,I}{I_o}$ |
|---|---|---|
| 8 | 4.36 | 6 |
| 9 | 4.107 | 35 |
| 10 | 3.895 | 2 |
| 11 | 3.714 | 50 |
| 13 | 3.417 | 16 |
| 14 | 3.293 | 45 |
| 16 | 3.078 | 2 |
| 17 | 2.987 | 55 |
| 18 | 2.904 | 10 |
| 20 | 2.754 | 12 |
| 21 | 2.688 | 4 |
| 22 | 2.626 | 20 |
| 24 | 2.515 | 6 |
| 25 | 2.464 | 4 |
| 26 | 2.414 | >1 |
| 27 | 2.371 | 3 |
| 29 | 2.289 | 1 |
| 30 | 2.249 | 3 |
| 32 | 2.177 | 7 |
| 33 | 2.144 | 10 |
| 34 | 2.113 | 3 |
| 35 | 2.083 | 4 |
| 36 | 2.053 | 9 |
| 41 | 1.924 | 7 |
| 42 | 1.901 | 4 |
| 44 | 2.858 | 2 |
| 45 | 1.837 | 3 |
| 49 | 1.759 | 2 |
| 50 | 1.743 | 13 |
| 53 | 1.692 | 6 |
| 54 | 1.676 | 2 |
| 55 | 1.661 | 2 |
| 57 | 1.632 | 4 |
| 59 | 1.604 | 6 |

The more significant d values for zeolite A are given in TABLE II

TABLE II

MOST SIGNIFICANT d VALUES FOR ZEOLITE A
d Value of Reflection in Å

| |
|---|
| 12.2 ± 0.2 |
| 8.7 ± 0.2 |
| 7.10 ± 0.15 |
| 5.50 ± 0.10 |
| 4.10 ± 0.10 |
| 3.70 ± 0.07 |
| 3.40 ± 0.06 |
| 3.29 ± 0.05 |
| 2.98 ± 0.05 |
| 2.62 ± 0.05 |

Occasionally, additional lines not belonging to the pattern for the zeolite appear in a pattern along with the X-ray lines characteristic of that zeolite. This is an indication that one or more additional crystalline materials are mixed with the zeolite in the sample being tested. Small changes in line positions may also occur under these conditions. Such changes in no way hinder the identification of the X-ray patterns as belonging to the zeolite.

The particular X-ray technique and/or apparatus employed, the humidity, the temperature, the orientation of the powder crystals and other variables, all of which are well known and understood to those skilled in the art of X-ray crystallography or diffraction can cause some variations in the intensities and positions of the lines. These changes, even in those few instances where they become large, pose no problem to the skilled X-ray crystallographer in establishing identities. Thus, the X-ray data given herein to identify the lattice for a zeolite, are not to exclude those materials which, due to some variable mentioned or otherwise known to those skilled in the art, fail to show all of the lines, or show a few extra ones that are permissible in the cubic system of that zeolite, or show a slight shift in position of the lines, so as to give a slightly larger or smaller lattice parameter.

A simpler test described in "American Mineralogist," Vol. 28, page 545, 1943, permits a quick check of the silicon to aluminum ratio of the zeolite. According to the description of the test, zeolite minerals with a three-dimensional network that contains aluminum and silicon atoms in an atomic ratio of $Al/Si = \frac{2}{3} = 0.67$, or greater, produce a gel when treated with hydrochloric acid. Zeolites having smaller aluminum to silicon ratios disintegrate in the presence of hydrochloric acid and precipitate silica. These tests were developed with natural zeolites and may vary slightly when applied to synthetic types.

U.S. Pat. No. 2,882,243 describes a process for making zeolite A comprising preparing a sodium-aluminum-silicate water mixture having an $SiO_2:Al_2O_3$ mole ratio of from 0.5:1 to 1.5:1, and $Na_2O/SiO_2$ mole ratio of from 0.8:1 to 3:1, and an $H_2O/Na_2O$ mole ratio of from 35:1 to 200:1, maintaining the mixture at a temperature of from 20° C. to 175° C. until zeolite A is formed, and separating the zeolite A from the mother liquor.

Experiments have been in progress in Japan since 1965 on the use of natural zeolite minerals as dietary supplements for poultry, swine and cattle. Significant increases in body weight per unit of feed consumed and in the general health of the animals was reported (Minato, Hideo, Koatsugasu 5:536, 1968). Reductions in malodor were also noted.

Using clinoptilolite and mordenite from northern Japan, Onagi, T. (Rept. Yamagata Stock Raising Inst. 7, 1966) found that Leghorn chickens required less food and water and gained as much weight in a two-week trial as birds receiving a control diet. No adverse effects on health or mortality were noted. The foregoing Japanese experiments were reported by F. A. Mumpton and P. H. Fishman in the *Journal of Animal Science*, Vol. 45, No. 5 (1977) pp. 1188–1203.

U.S. Pat. No. 3,836,676 issued to Chukei Komakine in 1974 discloses the use of zeolites as adsorbent moisture of ferrous sulfate crystals in an odorless chicken feed comprising such crystals and chicken droppings. The results were said to be no less than those in the case where chickens were raised with ordinary feed.

Canadian Pat. No. 939,186 issued to White et al in 1974 discloses the use of zeolites having exchangeable cations as a feed component in the feeding of urea or biuret non-protein (NPR) compounds to ruminants, such as cattle, sheep and goats. Natural and synthetic as well as crystalline and non-crystalline zeolites are disclosed. Zeolites tested included natural zeolites, chabazite and clinoptilolite and synthetic zeolites X, Y, F, J, M, Z, and A. Zeolite F was by far the most outstanding and zeolite A was substantially ineffective.

An article by C. Y. Chung et al from Nongsa Sihom Youngu Pogo 1978, 20 (Livestock) pp. 77–83 discusses the effects of cation exchange capacity and particle size of zeolites on the growth, feed efficiency and feed materials utilizability of broilers or broiling size chickens. Supplementing the feed of the broilers with naturally occurring zeolites, such as clinoptilolite, some increase in body weight gain was determined. Chung et al also reported that earlier results at the Livestock Experiment Station (1974, 1975, 1976—Suweon, Korea) showed that no significant difference was observed when 1.5, 3, and 4.5 percent zeolite was added to chicken layer diets.

A study by H. S. Nakaue of feeding White Leghorn layers clinoptilolite, reported in 1981 Poultry Science 60:944–949, disclosed no significant differences in eggshell strength between hens receiving the zeolite in their diet and hens not receiving the zeolite in their diet.

In a study at the University of Georgia, both broilers and layers were fed small amounts (about 2%) of clinoptilolite, a naturally occurring zeolite from Tilden, Texas. The eggshells from the hens receiving zeolite were slightly more flexible as measured by deformation, slightly less strong as measured by Instron breaking strength, and had a slightly lower specific gravity. The differences in eggshell quality were very small. This type of zeolite was ineffective in producing a stronger eggshell. An article written by Larry Vest and John Shutze entitled "The Influence of Feeding Zeolites to Poultry Under Field Conditions" summarizing the studies was presented at Zeo-Agriculture '82.

An important object of the present invention is to provide an improved treatment for enhancing avian, e.g. poultry egg hatching characteristics or parameters, wherein a small amount of zeolite is introduced directly into the egg prior to hatching.

It is another object of the invention to provide a poultry egg treatment wherein a small amount of zeolite A is directly introduced into the poultry egg, which is to be subsequently hatched, without causing a deleterious effect on the egg itself.

Another object of the invention is to provide an improved process for hatching of stronger, more vigorous and more energetic poultry chicks and turkey poults wherein an effective amount of zeolite, especially zeolite A, is added directly to the eggs for producing the poultry chicks.

Still another object of the invention is to cost effectively increase production of poultry chicks.

Further objects of the present invention are to increase the quality of fertilized eggs that will be subsequently hatched, and improve the quality of poultry chicks.

Other objects and advantages of the intention will be more fully understood from a reading of the description and claims hereinafter.

SUMMARY OF THE INVENTION

The present invention relates to a method of improving the quality of avian young, i.e., the weight, strength or vigor of poultry chicks without deleterious effects on the poultry egg, wherein a small amount of a zeolite is added directly to the eggs of the poultry prior to hatching of the poultry.

DESCRIPTION OF THE PREFERRED EMBODIMENT

It has been discovered that the addition of a relatively small amount of zeolite directly to an egg for hatching a poultry chick effectively improves the strength or vigor, or weight of the chick. Zeolite A is the preferred zeolite and is preferably added in amounts of from about 0.00001 percent to about 0.003 percent of the weight of the total egg.

EXAMPLE 1

Hatching Egg Study

An incubation study was conducted in which trace amounts of a commercial zeolite A were injected into hatching eggs the day after day 7 of incubation. The hole through which the injection took place was sealed with wax and the eggs were set in an incubator and hatched out. Suspensions of 50, 100, 250, 500, and 750 ppm of zeolite A were prepared and 0.1 ml portions were injected in each egg in groups of 100 eggs of equal weight for each treatment. For 65±0.1 gram eggs the following chick weights were obtained:

| Zeolite A (ppm) | 0 | 50 | 100 | 250 | 500 | 750 |
|---|---|---|---|---|---|---|
| Chick wt (grams) | 44.0 | 44.5 | 44.7 | 45.1 | 45.9 | 45.2 |

The water suspensions of zeolite A were prepared with sterile water, i.e. water free of bacteria or other harmful substances which might have a deleterious effect on the chick embryos.

Sterile water should be used in commercial operations.

The procedure used was to incubate the eggs for 7 days and candle them on the 8th day, injecting the zeolite A into the air space between the chorioallantoic membrane and the shell, and then sealing. Only fertile eggs were injected.

From the foregoing, it is clear that infusion of zeolite into the eggs substantially improved hatching parameters or characteristics. As a practical matter and the present state of the art, injection of each individual egg with a suspension of zeolite would not be economically feasible. Since the pore size of chicken eggshells average about 7–9 microns and the preferred zeolite averages a particle size less than 3 microns, soaking of the hatching eggs in a zeolite-water suspension is economical. Concentrations of zeolite are generally limited to avoid suspensions of such high concentrations that tend to plug the pores of the eggshells and result in the death of the poultry embryos upon incubation.

For chicken eggs, water suspensions of zeolite with a concentration of the zeolite in the water of about 200–500 ppm are most preferred. Zeolite concentrations of 100–750 ppm are preferred with zeolite concentrations of about 50–2000 ppm or higher, e.g. 3000 ppm, being suitable. The concentration of the zeolite in the water should be sufficiently strong to provide an effective increase in the strength of the poultry chick upon incubation, but not be of such strength as would have a deleterious effect on the chick embryo.

It can be appreciated that concentrations of zeolites in water suspensions will vary somewhat with the type of poultry egg being treated. Larger eggs generally have larger pore sizes and thus would permit stronger concentrations. Turkey eggs for example are usually larger than chicken eggs and their shells have pores that are much larger in diameter.

In the most preferred method of carrying out the invention, eggs are incubated for one day at about 100° F., and then placed in the water suspension of zeolite at room temperature or about 80° F. The zeolite is quickly absorbed by the eggs. A temperature differential of about 20° F. is generally sufficient to provide a desired degree of absorption as indicated. The temperature of the suspension is lower than the temperature of the egg.

Temperature differential of from about 1.5 to about 30° F. or greater can be used.

Soaking of poultry eggs at day one of incubation results in increased fertility, i.e. a greater percentage of the eggs are hatched than would normally be expected. An improvement in overall hatchability from a present broiler chicken industry norm of about 82% to a hatchability approaching 98% is feasible when practicing this invention.

Hatching eggs or poultry eggs to be incubated and/or hatched have their hatching characteristics or parameters improved by inserting a very dilute suspension of zeolites, particularly zeolite A, through the pores of the eggs prior to incubation.

EXAMPLE 2

This study involved the use of 3000 broiler chicken eggs. The eggs were randomly divided into five (5) treatments of 600 eggs per treatment. The 600 eggs were randomly divided into 6 replicates of 100 eggs each. Into each egg, 0.1 ml of test suspension or control was injected by needle into the air space as described in Example 1.

Egg and chick weight of all hatched chicks were determined for the entire population. Results were as follows.

TABLE A

POPULATION WEIGHT DATA

| Zeolite (ppm) | Average Weight of Fertile Eggs (g) | Chick Weight (avg.) | Ratio* (chick wt./egg wt.) |
|---|---|---|---|
| 0 | 65.8$^a$ | 43.4$^b$ | 0.659$^b$ |
| 250 | 65.9$^a$ | 43.9$^{ab}$ | 0.667$^{ab}$ |
| 500 | 66.0$^a$ | 44.4$^a$ | 0.672$^a$ |
| 750 | 66.1$^a$ | 44.1$^{ab}$ | 0.668$^a$ |
| 1000 | 66.4$^a$ | 44.4$^a$ | 0.669$^a$ |

*Apparent errors due to rounding

In the above and the following tables in this Example, the significance of the superscripts are as follows. In the columns, data with different superscripts are significantly different, and data with the same superscripts are not, both to the 95% confidence level. Hence, none of the fertile egg weight averages in the second column above are significantly different. In the third column, the chick weight average, the value for control chicks (0.0 ppm zeolite injection) is significantly different from the averages for 500 and 1000 ppm, but not for 250 and 750 ppm. The values 43.9 and 44.1 are not significantly different from each other or any other value.

The data indicate that the chicks hatching from control eggs weighed less than chicks from eggs injected with zeolite A (250, 500, 750 and 1000 ppm). The data for chicks from eggs injected with 750 ppm zeolite A is not significantly different from the controls; this result is believed to be an artifact.

In the ratio column, 0.659 is significantly different from 0.672, 0.668, and 0.669, but not significantly different from 0.667. The four values with the superscript "a" are not significantly different from each other. The value 0.667 is not significantly different from any other value in the fourth column, since it has a superscript which matches a superscript for every other entry in the column.

When the chicks were hatched, 5 from each replicate were sacrificed and bone data was obtained. The eggshells from the sacrificed chicks were analyzed to determine the percent of eggshell ash:

$$\frac{\text{weight ash}}{\text{weight eggshell}} \times 100 = \text{eggshell ash percent}$$

The data for the sacrificed chicks is as follows.

TABLE B

SACRIFICED HATCHED CHICK DATA

| Zeolite (ppm) | Chick Weight (g) | Tibia Weight (g) | Tibia Length (mm) | EggShell Ash (%) | Tibia Ash (%) |
|---|---|---|---|---|---|
| 0 | 43.0 ± 0.7$^a$ | 478 ± 8$^c$ | 27.1 ± .1$^b$ | 89.7 ± 0.5$^a$ | 42.7 ± 0.7$^a$ |
| 250 | 44.1 ± 0.9$^a$ | 490 ± 9$^{bc}$ | 27.9 ± .1$^a$ | 84.8 ± 0.7$^b$ | 42.8 ± 0.7$^a$ |
| 500 | 42.5 ± 0.7$^a$ | 475 ± 8$^c$ | 27.8 ± .2$^a$ | 81.9 ± 0.9$^c$ | 43.1 ± 0.9$^a$ |
| 750 | 45.0 ± 0.5$^a$ | 499 ± 9$^{ab}$ | 27.9 ± .1$^a$ | 84.3 ± 0.8$^b$ | 43.1 ± 0.9$^a$ |
| 1000 | 44.1 ± 0.7$^a$ | 512 ± 11$^a$ | 27.9 ± .1$^a$ | 89.9 ± 0.6$^a$ | 43.0 ± 0.9$^a$ |

The following hatch data was obtained. The eggs were candled 7 days after they were placed in the incubator. If an embryo was detected inside the eggs, they were deemed fertile; if no embryo was detected, they were deemed infertile. The number of eggs that hatched was divided by the number of fertile eggs to determine fertile hatch %. The percentage of eggs that did not hatch or show pip(s) is given in the following table. The percent pips is the number of pipped shells that did not hatch divided by the number of fertile eggs. (Pipped shells are those which have been at least partially broken open by the chick in attempting to hatch.)

TABLE C

HATCH DATA

| Zeolite (ppm) | Fertile Hatch (%) | Eggs % | Pips % |
|---|---|---|---|
| 0 | 88.0 ± 1.2$^a$ | 10.2 ± 1.1$^a$ | 1.8 ± 0.4$^a$ |
| 250 | 90.9 ± 1.2$^a$ | 9.3 ± 1.1$^a$ | 0.7 ± 0.4$^a$ |
| 500 | 91.9 ± 1.3$^a$ | 8.1 ± 1.2$^a$ | 0.8 ± 0.3$^a$ |
| 750 | 88.6 ± 1.7$^a$ | 10.3 ± 1.4$^a$ | 1.1 ± 0.5$^a$ |
| 1000 | 89.2 ± 1.6$^a$ | 10.3 ± 1.6$^a$ | 0.5 ± 0.3$^a$ |

Continuing the study, 45 chicks from each replicate of each treatment (270 birds × 5 treatments for a total of 1350 chicks) were grown to market weight and performance data obtained. Results are set forth in the tables below.

TABLE D

CHICKS GROWN TO MARKET WEIGHT (5 × 270 CHICKS)

| Zeolite (ppm) | Body Weight (grams) Weeks | | |
|---|---|---|---|
| | 0 | 4 | 7 |
| 0 | 41.3 ± 0.2$^b$ | 897 ± 06$^a$ | 1932 ± 10$^b$ |
| 250 | 40.9 ± 0.2$^b$ | 909 ± 06$^a$ | 1965 ± 11$^{ab}$ |
| 500 | 41.0 ± 0.2$^b$ | 910 ± 05$^a$ | 1979 ± 10$^a$ |
| 750 | 42.1 ± 0.2$^a$ | 907 ± 05$^a$ | 1979 ± 25$^a$ |
| 1000 | 41.1 ± 0.2$^b$ | 914 ± 06$^a$ | 1985 ± 10$^a$ |

TABLE D-continued

CHICKS GROWN TO MARKET WEIGHT
(5 × 270 CHICKS)

| Zeolite (ppm) | Gain (grams) | | |
|---|---|---|---|
| | Weeks | | |
| | 0–4 | 4–7 | 0–7 |
| 0 | 865 ± 06[a] | 1035 ± 08[a] | 1890 ± 10[b] |
| 250 | 868 ± 06[a] | 1056 ± 08[a] | 1924 ± 11[ab] |
| 500 | 869 ± 05[a] | 1068 ± 08[a] | 1938 ± 10[a] |
| 750 | 867 ± 06[a] | 1072 ± 24[a] | 1943 ± 29[a] |
| 1000 | 873 ± 06[a] | 1071 ± 06[a] | 1944 ± 10[a] |

It appears that benefits in weight gain and weight begin to appear between 4 and 7 weeks.

TABLE E

CHICKS GROWN TO MARKET WEIGHT

| Zeolite (ppm) | Weeks | | |
|---|---|---|---|
| | 0 | 4 | 7 |
| Male Body Weight (grams) | | | |
| 0 | 43.3 ± 0.4[a] | 896 ± 13[b] | 2050 ± 20[a] |
| 250 | 42.9 ± 0.4[a] | 929 ± 11[a] | 2097 ± 18[a] |
| 500 | 43.3 ± 0.4[a] | 950 ± 11[a] | 2095 ± 18[a] |
| 750 | 42.9 ± 0.4[a] | 932 ± 11[a] | 2053 ± 21[a] |
| 1000 | 43.0 ± 0.4[a] | 867 ± 12[b] | 2031 ± 21[a] |
| Female Body Weight (grams) | | | |
| 0 | 42.7 ± 0.4[a] | 803 ± 10[b] | 1741 ± 15[b] |
| 250 | 42.2 ± 0.3[a] | 792 ± 9[b] | 1738 ± 15[b] |
| 500 | 43.1 ± 0.3[a] | 837 ± 8[a] | 1791 ± 15[a] |
| 750 | 42.6 ± 0.3[a] | 806 ± 11[b] | 1764 ± 14[ab] |
| 1000 | 43.1 ± 0.4[a] | 799 ± 10[b] | 1780 ± 17[ab] |

TABLE F

CHICKS GROWN TO MARKET WEIGHT

| Zeolite (ppm) | Weeks | | |
|---|---|---|---|
| | 0–4 | 4–7 | 0–7 |
| Male Weight Gain (grams) | | | |
| 0 | 853 ± 12[b] | 1154 ± 13[a] | 2007 ± 20[a] |
| 250 | 886 ± 10[a] | 1168 ± 14[a] | 2054 ± 18[a] |
| 500 | 907 ± 11[a] | 1145 ± 14[a] | 2052 ± 18[a] |
| 750 | 889 ± 11[a] | 1121 ± 15[a] | 2010 ± 20[a] |
| 1000 | 824 ± 12[b] | 1164 ± 14[a] | 1988 ± 21[a] |
| Female Weight Gain (grams) | | | |
| 0 | 761 ± 10[b] | 938 ± 11[a] | 1699 ± 15[b] |
| 250 | 750 ± 9[b] | 946 ± 11[a] | 1696 ± 15[b] |
| 500 | 794 ± 8[a] | 953 ± 12[a] | 1748 ± 15[a] |
| 750 | 763 ± 11[b] | 958 ± 10[a] | 1721 ± 14[ab] |
| 1000 | 756 ± 10[b] | 980 ± 12[a] | 1737 ± 17[ab] |

TABLE G

CHICKS GROWN TO MARKET WEIGHT
Feed Conversion (Feed/Body Weight)

| Zeolite (ppm) | Weeks | | |
|---|---|---|---|
| | 0–4 | 4–7 | 0–7 |
| 0 | 1.24 ± .03[a] | 2.49 ± .04[a] | 1.92 ± .02[a] |
| 250 | 1.24 ± .02[a] | 2.48 ± .05[a] | 1.92 ± .02[a] |
| 500 | 1.23 ± .03[a] | 2.50 ± .04[a] | 1.91 ± .02[a] |
| 750 | 1.24 ± .03[a] | 2.52 ± .04[a] | 1.93 ± .01[a] |
| 1000 | 1.25 ± .03[b] | 2.43 ± .02[a] | 1.91 ± .01[a] |

TABLE H

NON-SACRIFICED CHICKS
Mortality (%)

| Zeolite (ppm) | Weeks | | |
|---|---|---|---|
| | 0–4 | 4–7 | 0–7 |
| 0 | 5.8 ± 1.7 | 2.5 ± 0.9 | 8.3 ± 2.3 |
| 250 | 5.8 ± 1.1 | 1.6 ± 0.8 | 7.5 ± 0.9 |
| 500 | 4.2 ± 1.2 | 1.6 ± 0.8 | 5.8 ± 1.2 |
| 750 | 6.3 ± 1.9 | 2.5 ± 1.3 | 9.8 ± 2.7 |
| 1000 | 5.0 ± 1.3 | 4.6 ± 2.3 | 9.6 ± 1.5 |

From the above data it appears:

Fertile egg weights were not different, hatched chick weights were statistically different from controls.

Chick weight/egg weight ratio appears to have peaked at 500 ppm.

Tibia lengths for all of the zeolite treated eggs were statistically greater than the controls.

Percent hatch of fertile eggs were numerically higher for the zeolite treated eggs although not statistically different.

Percent eggshell ash was lowest for the 500 ppm level—the same level at which the chick weight and chick weight/ egg weight ratio were greatest. This indicates that more shell was drawn by the chick during incubation. Why shell ash was higher for the 1000 ppm level is still unexplainable.

Chicks from zeolite treated eggs grow better—weight gain improvements of 1.8 to 2.9%, statistically significant at the 500, 750, and 1000 ppm levels for the entire growing period of 0–7 weeks. For intermediate periods 0–4 and 4–7 the improvements are numerically indicated, but not at the 95% confidence levels. The weight gain advantages are more prominent in females than in males; this is reflected statistically.

Although no different statistically, the 500 ppm level was lowest in mortality, whereas the control and 750 and 1000 ppm were highest. Whether this indicates that concentrations of 750 ppm–1000 ppm should not be used is not yet known and requires further study.

The results of the test disclose various manifestations of the increased vigor of the organisms treated with the zeolite. As demonstrated by the data, the organisms were bigger, converted food better, and grew better. Furthermore, there are visual manifestations of enhanced vigor. Hatching time tends to be reduced. Upon hatching, the newly hatched chicks tend to be more active, and more alert. They go to the feed tray and begin to feed earlier.

The visual evidence of enhanced vigor is even more pronounced in turkeys. Newly hatched turkey poults without zeolite treatment are much more inactive than newly hatched chickens. They can be completely inactive for up to a whole day after hatching, and are listless for up to four days. With turkey poults hatched from zeolite-treated eggs, the poults are much more active, alert, and they feed more often. The increased vigor in the first few days is important since this is ordinarily a period with high mortality. Thus it is clear that the process of this invention produced healthier, higher quality birds, i.e. birds that are heavier, more vigorous, and more energetic.

EXAMPLE 3

The first portion of this turkey egg injection study was done with eggs from very young turkeys on an experimental farm. (Ordinarily in the industry, eggs from very young turkeys give low percentage hatch and poults are raised to "fryer" size only.) On the farm, the artificial insemination program was new and overall egg fertility was still low. Eggs were treated with 0.1 ml of zeolite A suspension containing 0, 500, and 750 ppm of the zeolite. Results were as follows:

| | Zeolite A (ppm in sterile water suspension) | | |
|---|---|---|---|
| | 0 | 500 | 750 |
| Egg wt. (grams) | 77.3 ± 1.0 | 77.5 ± 1.7 | 75.8 ± 1.3 |
| Poult wt. (grams), (at hatch) | 51.8 ± 1.0 | 52.0 ± 1.3 | 51.3 ± 1.1 |
| Poult wt./egg wt. ratio | 0.670 ± 0.007 | 0.671 ± 0.009 | 0.676 ± 0.006 |
| % Hatchability | 44.4 | 42.2 | 48.9 |
| % Mortality to 4 weeks age | 21.7 | 9.5 | 8.0 |
| Poult wt. at 4 weeks age (grams) | 768 ± 37 | 805 ± 38 | 783 ± 28 |
| Wt. gain to 4 weeks age (grams) | 716 ± 38 | 754 ± 38 | 732 ± 28 |
| Weak legs (at hatch) | 8 | 2 | 0 |
| Weak legs (at 28 days) | 3 | 0 | 0 |

The study was essentially repeated. For the repetition the turkey flock was now more mature and the artificial insemination system had been routined. The improvement in the insemination system is shown by the percent hatchability data in the following Table when compared to the equivalent data in the Table immediately above. For the repeated experiment the concentrations of zeolite A were 0, 1000, and 2000 ppm. Again, 0.1 ml of zeolite suspension was injected into the egg. Results are as follows:

| | Zeolite A (ppm in sterile water suspension) | | |
|---|---|---|---|
| | 0 | 1000 | 2000 |
| Egg wt. (grams) | 79.3 ± 1.0 | 78.9 ± 1.1 | 77.4 ± 1.2 |
| Poult wt. (grams), (at hatch) | 53.0 ± 0.7 | 54.3 ± 0.9 | 52.5 ± 1.1 |
| Poult wt./egg wt. ratio | 0.668 ± 0.005$^b$ | 0.689 ± 0.004$^a$ | 0.678 ± 0.006$^{ab}$ |
| % Hatchability | 70 | 83 | 83 |
| % Mortality to 4 weeks age | 16.7 | 8.3 | 3.8 |
| Poult wt. at 4 weeks age (grams) | 751 ± 37 | 766 ± 23 | 774 ± 31 |
| Wt. gain to 4 weeks age (grams) | 698 ± 35 | 712 ± 23 | 721 ± 29 |
| Weak legs (at hatch) | 5 | 0 | 3 |
| Weak legs (at 28 days) | 3 | 0 | 0 |

$^a$ and $^b$ are statistically different at the 95% confidence level.

In both of the above trials, 50 eggs per treatment were used. The eggs were incubated for 10 days prior to injection of the zeolite suspension. Incubation was continued for the remaining 28 day incubation period for turkey eggs.

After hatching the poults were fed to 4 weeks of age using a conventional turkey starter ration.

From the above it appears the zeolite treatment resulted in:
1. Improved poult wt./egg wt. ratio
2. Improved percent hatch.
3. Stronger poults at hatch (the weak leg condition is referred to as "spraddle legs" by the turkey industry). Stronger poults (less weak legs) at 4 weeks of age.
4. Better weight gains to 4 weeks of age.
5. Better liveability (less mortality).

Best results appear to be at 750-1000 ppm concentration

It was noted that poults from eggs injected with zeolite A initiate hatch from 12 to 24 hours earlier than poults from the controlled eggs. This clearly demonstrates that poults resulting from treatment according to the process of this invention are stronger and therefore able to pip their shells sooner.

EXAMPLE 4

The objective of this study was to determine the feasibility of spraying hatching eggs with zeolite suspension at the farm before transport to the hatchery. To enhance uptake of the suspension of the zeolite, the suspension was chilled in an ice water bath prior to spraying. The eggs to be sprayed were at room temperature. For the study 150 eggs for each treatment were used. The results appear in the following Table. The superscripts a and b in the Table have the same significance as

| Broiler Egg Spray Study (Screening Study) | | | |
|---|---|---|---|
| Zeolite Suspension ppm | Egg Wt. g | Chick Wt. g | Ratio Chick Wt./ Egg/Wt. |
| 0 | 66.67$^a$ | 43.40$^a$ | .650$^b$ |
| 500 | 67.00$^a$ | 43.60$^a$ | .651$^b$ |
| 750 | 66.53$^a$ | 44.07$^a$ | .662$^a$ |
| 1000 | 66.55$^a$ | 42.96$^b$ | .645$^b$ |
| 1250 | 67.06$^a$ | 43.36$^a$ | .647$^b$ |
| 1500 | 66.97$^a$ | 43.81$^a$ | .654$^{ab}$ |

Only the 750 ppm level was clearly different in ratio at the 95% confidence level.

EXAMPLE 5

As hens get older, the fertility of their eggs decreases such that the percent of eggs that hatch is markedly reduced when compared to eggs from younger more robust hens. In the industry, hens are usually kept only until they are 62–65 weeks of age. The study reported in this Example utilized broiler breeder hens that were 70 weeks old when the study was initiated. For the study, 100 eggs for each treatment were employed. The results are as follows.

| Spraying Eggs from Old Broiler Breeder Hens | | | |
|---|---|---|---|
| Zeolite ppm in Spray | % Fertility | % Hatch of Fertile Eggs | % Hatch of Total eggs Set |
| 0 | 63.5 | 73.8 | 46.8 |
| 250 | 69.2 | 68.5 | 41.2 |
| 500 | 64.1 | 86.0 | 55.0 |
| 750 | 65.8 | 78.0 | 51.3 |
| 1000 | 70.8 | 75.4 | 53.2 |

The above results indicate that treatment of eggs from old chicken breeder hens with a zeolite according to the process of this invention can increase the percentage of eggs that hatch.

The addition of as little as 30 micrograms of zeolite A to a 60 gram hatching egg results in a 0.5 gram heavier chick at hatching.

Significant chick weight improvements are achieved when zeolite suspensions are injected directly into the egg air space.

Heavier hatched chicks grow faster and convert feed more efficiently than smaller chicks. Industry and literature data indicates that a 1.9 gram heavier chick translates into at least a 6% heavier broiler at grow-out. This result reduces the growout period by 3 days and cost of production by almost 4%.

The term poultry as used herein includes all domestic fowl, namely chickens, turkeys, ducks, geese, and the like.

Eggs of broiler breeders, commercial layers and turkeys are especially suitable for treatment with zeolites.

From the above it is clear that the addition of a zeolite such as a zeolite A to the eggshell of poultry can produce a chick or poult of improved quality, i.e. a chick or poult having at least one improved characteristic. Chicks or poults of this invention are stronger, i.e. less weak than chicks or poults produced from untreated eggs. Chicks or poults are more vigorous. They grow faster, or convert food better. They are more alert and more active. Heavier chicks or poults are produced when eggs are treated according to this invention. Thus increased vigor exists prior to hatching. Furthermore, eggs take less time to hatch, and eggs from older hens are more likely to hatch. Thus, it is clear that the invention provides an improvement in avian hatching characteristics. From the above it is clear that this invention improves a number of hatching parameters or charactistics, improves avian quality, provides stronger birds, more vigorous organisms. The improved strength, vigor and quality exist in the embryo and the hatched organism.

The percent hatch improvement, evident in Examples 2, 3 & 5 with both broiler and turkey eggs, is of particular economic import. It allows a producer to maintain chick or poult output with fewer breeder hens; thereby reducing a very expensive unit operating cost factor. Furthermore, the practice of this invention will result in more of the eggs set in incubators hatching into vigorous chicks or poults. The cost of broiler chicken eggs is about $0.16 each and turkey eggs $1.25 each. Accordingly, it is apparent that reduction in these cost items will also reduce overall costs substantially.

Eggs from avian species other than domestic poultry may also benefit from zeolite treatment. Among these are included Bob White quail and pheasants grown for release in game preserves, pidgeons grown for squab delicacy or for racing sport, and other birds grown for show birds and for bird fanciers.

It is suggested that this invention can be extended to use with other non-domesticated avian species. More and more frequently, breeding pairs, eggs, and immature young of rare and/or endangered species are being raised and managed in programs directed to prevention of species extinction. It is believed that good results of the type described above could be obtained by treating eggs of such birds with zeolite A or a similar zeolite in order to improve the quality, health, weight or strength of chicks hatched from the treated eggs. Thus, this invention may be useful in developing larger, more stable populations of avian species that may otherwise become extinct.

It is also suggested that eggs of endangered reptilian species, e.g. turtles, may also be treated according to the method of this invention. The foregoing disclosure and description of the invention is illustrative and explanatory thereof and various changes in the illustrated process may be made within the scope of the appended claims without departing from the spirit of the invention.

What is claimed is:

1. A method of improving the hatching parameters of poultry eggs which comprises incubating the egg for about one day at about 100° F., placing the warm incubated egg in a water suspension of zeolite wherein the temperature of the suspension is from about 1.5° F. to about 30° F. lower than the temperature of the egg just prior to being placed therein, soaking the egg in such solution, and thereafter incubating the egg to cause hatching of a poultry chick to occur.

2. The method of claim 1, wherein the poultry chick is selected from the group consisting of chickens and turkeys.

3. The method of claim 1, wherein the zeolite is a zeolite A.

4. The method of claim 1, wherein the water of the water suspension of zeolite is sterile water.

5. The method of claim 4, wherein the zeolite of the water suspension is a zeolite A.

6. The method of claim 1, wherein the amount of zeolite added to the poultry egg during such soaking is in a sufficient amount to increase the quality of the poultry chick after hatching but not in such an amount that would have a deleterious effect on the chick embryo prior to hatching.

7. A method of improving the hatching parameters of poultry eggs during incubation, wherein the poultry eggs are soaked in a suspension of zeolite in water for a period of from about five to twenty minutes just prior to placement in the incubator; the temperature of said suspension being from about 15° to about 25° F. lower than the temperature of said eggs.

8. The method of claim 7, wherein the zeolite is a zeolite A.

9. The method of claim 7, wherein the concentration of the zeolite in the water suspension of zeolite is from about 50–3000 ppm.

10. The method of claim 7, wherein the concentration of the zeolite in the water suspension is about 100–750 ppm.

11. The method of claim 7, wherein the concentration of the zeolite in the water suspension of zeolite is about 50–2000 ppm.

12. The method of claim 7, wherein the poultry eggs are soaked in a zeolite-water suspension for at least five minutes of the incubation period.

13. A method of improving the hatching parameters of poultry eggs during incubation, wherein the poultry eggs are sprayed with a suspension of zeolite in water; the temperature of said suspension being lower than the temperature of said eggs by from about 15° to about 25° F.

14. An improved egg for hatching produced by the method of claim 9.

* * * * *